(12) United States Patent
Zalzalah et al.

(10) Patent No.: US 10,623,955 B2
(45) Date of Patent: Apr. 14, 2020

(54) INTEGRATED CELLULAR SYSTEM WITH WI-FI-FALLBACK

(71) Applicants: Luay Zalzalah, Ottawa (CA); Najeh Abu-Farha, Ottawa (CA)

(72) Inventors: Luay Zalzalah, Ottawa (CA); Najeh Abu-Farha, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 592 days.

(21) Appl. No.: 14/538,006

(22) PCT Filed: Oct. 30, 2014

(86) PCT No.: PCT/IB2014/065717
§ 371 (c)(1),
(2) Date: Nov. 11, 2014

(87) PCT Pub. No.: WO2016/067078
PCT Pub. Date: May 6, 2016

(65) Prior Publication Data
US 2016/0262020 A1 Sep. 8, 2016

(51) Int. Cl.
*H04W 12/08* (2009.01)
*H04L 29/06* (2006.01)
(Continued)

(52) U.S. Cl.
CPC .......... *H04W 12/08* (2013.01); *H04L 63/101* (2013.01); *H04W 12/06* (2013.01);
(Continued)

(58) Field of Classification Search
CPC ... H04W 84/005; H04W 84/02; H04W 84/12; H04W 88/06; H04L 45/22; H04L 45/28
See application file for complete search history.

(56) References Cited

U.S. PATENT DOCUMENTS 5,570,366 A * 10/1996 Baker ........................... 370/312
6,363,065 B1 * 3/2002 Thornton ................ H04L 12/14
370/352
(Continued)

FOREIGN PATENT DOCUMENTS

EP 1657853 A1 * 5/2006 ............ H04W 36/24
EP 2104388 A1 9/2009
(Continued)

OTHER PUBLICATIONS

P. Calhoun, et al: "Lightweight Access Point Protocol", Feb. 28, 2010, pp. 1-125, XP055198707.
(Continued)

*Primary Examiner* — Lynn D Feild
*Assistant Examiner* — Richard A McCoy
(74) *Attorney, Agent, or Firm* — Coats & Bennett, PLLC

(57) ABSTRACT

A method and apparatus for providing fallback data services over a Wi-Fi network is described. A request to enable access to new data sessions for wireless terminals in a zone covered by a Wi-Fi network node is received upon failure of 3GPP radio in that zone. When a request for a new data session from a WT is received, the MAC address of the WT is added to a list of authorized users. The MAC address of the WT is sent to Wi-Fi network nodes of adjacent zones such that the WT can have continuous service as it moves between zones. When a Wi-Fi network node currently serving the WT receives an indication that the WT data session is terminated, a message is sent from the Wi-Fi network node currently serving the WT, to nodes of adjacent zones to remove the MAC address of the WT from the list of authorized users.

13 Claims, 8 Drawing Sheets

(51) Int. Cl.
*H04W 36/00* (2009.01)
*H04W 12/06* (2009.01)
*H04W 48/04* (2009.01)
*H04W 76/34* (2018.01)
*H04W 76/15* (2018.01)
*H04W 84/12* (2009.01)
*H04W 92/20* (2009.01)
*H04L 29/12* (2006.01)
*H04W 88/02* (2009.01)
*H04W 88/12* (2009.01)

(52) U.S. Cl.
CPC ....... *H04W 36/0022* (2013.01); *H04W 48/04* (2013.01); *H04L 61/6022* (2013.01); *H04L 63/162* (2013.01); *H04W 36/0016* (2013.01); *H04W 36/0033* (2013.01); *H04W 76/15* (2018.02); *H04W 76/34* (2018.02); *H04W 84/12* (2013.01); *H04W 88/02* (2013.01); *H04W 88/12* (2013.01); *H04W 92/20* (2013.01)

(56) References Cited

U.S. PATENT DOCUMENTS

| | | | | |
|---|---|---|---|---|
| 8,572,698 | B1 * | 10/2013 | Kandasamy | H04W 84/06 370/328 |
| 9,270,585 | B2 * | 2/2016 | Manion | H04L 45/02 |
| 2006/0286984 | A1 * | 12/2006 | Bonner | H04W 36/14 455/445 |
| 2007/0135114 | A1 * | 6/2007 | Valentino | H04W 88/06 455/422.1 |
| 2008/0170550 | A1 * | 7/2008 | Liu | H04W 40/26 370/338 |
| 2008/0207227 | A1 | 8/2008 | Ren et al. | |
| 2009/0124284 | A1 * | 5/2009 | Scherzer | H04M 1/72561 455/552.1 |
| 2010/0041434 | A1 | 2/2010 | Hirano | |
| 2010/0067435 | A1 | 3/2010 | Balachandran et al. | |
| 2010/0154044 | A1 * | 6/2010 | Manku | H04L 12/5691 726/7 |
| 2011/0151861 | A1 | 6/2011 | Kim et al. | |
| 2011/0188421 | A1 * | 8/2011 | Nakahara | H04W 52/02 370/311 |
| 2012/0120922 | A1 * | 5/2012 | Huang | H04W 36/24 370/332 |
| 2013/0077482 | A1 * | 3/2013 | Krishna | H04W 36/22 370/230 |
| 2013/0083661 | A1 * | 4/2013 | Gupta | H04W 28/0215 370/235 |
| 2013/0121182 | A1 | 5/2013 | Hegge | |
| 2013/0137423 | A1 | 5/2013 | Das et al. | |
| 2013/0347073 | A1 * | 12/2013 | Bryksa | H04L 63/105 726/4 |
| 2014/0181515 | A1 | 6/2014 | Yang | |
| 2014/0310024 | A1 * | 10/2014 | Chang | G06F 19/322 705/3 |
| 2014/0329526 | A1 | 11/2014 | Sundararajan | |
| 2014/0334306 | A1 * | 11/2014 | Yang | H04L 47/12 370/235 |
| 2015/0124791 | A1 | 5/2015 | Mazandarany | |
| 2015/0319654 | A1 | 11/2015 | Hayashi | |
| 2015/0334675 | A1 * | 11/2015 | Cho | H04W 24/02 455/435.1 |
| 2016/0112941 | A1 * | 4/2016 | Desai | H04L 12/145 370/329 |
| 2016/0212666 | A1 | 7/2016 | Zalzalah et al. | |

FOREIGN PATENT DOCUMENTS

| | | | |
|---|---|---|---|
| EP | 2677773 A1 | 12/2013 | |
| GB | 2457656 A | 8/2009 | |
| WO | 2007036764 A1 | 4/2007 | |
| WO | WO 2010145273 A1 * | 12/2010 | ............ H04W 12/06 |
| WO | WO2014/094849 A1 | 6/2014 | |
| WO | WO2014/112941 A1 | 7/2014 | |

OTHER PUBLICATIONS

"P802.11F Draft Recommended Practice for Multi-Vendor Access Point Interoperability via an Inter-Access Point Protocol Across Distribution Systems Supporting IEEE 802.11 Operation", Mar. 31, 2003, pp. 1-70, XP055198709.
PCTIB2014065717 International Search Report.
3rd Generation Partnership Project, "Technical Specification Group Radio Access Network; UTRAN lub Interface Node B Application Part (NBAP) signalling (Release 11)," 3GPP TS 25.433 V11.8.0; Jun. 2014, pp. 1-579.

\* cited by examiner

INTEGRATED CELLULAR SYSTEM WITH WI-FI-FALLBACK

TECHNICAL FIELD

The present invention relates to methods and apparatus for providing services and mobility fallback through a Wi-Fi network in the event cellular (3GPP) services are interrupted.

BACKGROUND

Mobile operators are beginning to use wireless networks such as wireless local area networks based on the IEEE standard 802.11 or Wi-Fi networks to offload traffic from radio access networks (RAN) or mobile networks such as, for example, Global System for Mobile Communications (GSM), cdma2000, Wideband Code Division Multiple Access (WCDMA) and Long Term Evolution (LTE)/LTE Advanced (e.g. 2G/3G/4G and beyond). Most of the current Wi-Fi deployments are totally separate from mobile networks, and are regarded as non-integrated. The usage of Wi-Fi is mainly driven due to the availability of free and wide unlicensed spectrum and the increased availability of Wi-Fi technologies in wireless terminals (WT).

Today's Indoor Wireless Systems service offerings can be categorized into anyone of a number of solutions.

A Distributed Antenna System (DAS) is a shared infrastructure model for expanding a wireless network footprint. It supports both 3GPP and Wi-Fi expansion with no interworking between both standards. Wi-Fi 802.11, is based on Unlicensed Spectrum with no seamless interworking with 3GPP. A Pico-Cell is based on 3GPP Licensed Spectrum with no seamless interworking with Wi-Fi. A Femto-Cell is based on both Licensed and Unlicensed Spectrum with no seamless interworking with either 3PGG or Wi-Fi and a Micro-Cell is based on 3GPP Licensed Spectrum with no seamless interworking with Wi-Fi.

There are various types of Wi-Fi integration to mobile networks, for simplicity, the notation of 3rd Generation Partnership Project (3GPP) networks using System Architecture Evolution (SAE)/LTE nodes are described herein by way of example only. However, it is to be appreciated that similar or like network entities or nodes may be used in any other mobile network, for example, 2G/3G/4G and beyond mobile networks such as GSM, WCDMA, Universal Mobile Telecommunications System (UMTS) Terrestrial Radio Access Network (UTRAN), Enhanced-UTRAN, LTE, and LTE-Advanced.

Wi-Fi integration towards the mobile core network (also known as cellular core network) is emerging as a good way to improve the end user experience further between the cellular and Wi-Fi accesses of each operator. These solutions consist mainly of the components: common authentication between 3GPP and Wi-Fi, and integration of Wi-Fi user plane traffic to the mobile core network. The common authentication is based on automatic SIM-based authentication in both access types. The Wi-Fi user plane integration provides the mobile operator the opportunity to provide the same services, like parental control and subscription based payment methods, for the end users when connected both via 3GPP and via Wi-Fi. Different solutions are specified in standardized in 3GPP Technical Specification 23.402, and may include overlay solutions (S2b, S2c) and integrated solutions (S2a), which are currently being further developed (S2a, S2b, S2c indicating the 3GPP interface/reference point name towards the packet data network (PDN) Gateway (PDN-GW)).

Wi-Fi services, even when integrated with a 3GPP network, are not set-up to provide a secondary source of data services to a wireless terminal in the event the 3GPP network services are interrupted. For a Wireless Terminal (WT), a 3GPP service interruption will require the establishment of a new data session either with another 3GPP radio node or a Wi-Fi access point. However, such an attempt on the part of the WT will not be possible if the 3GPP network is severely interrupted and no open Wi-Fi AP (AP) is in the serving area. In either of these cases, a WT cannot get continuous data service or even access a new service session. Unfortunately, such events do not provide customers of existing 3GPP operators a good user experience.

Therefore, there is a significant need to provide a mechanism to efficiently provide continuous data sessions and mobility to WTs in the event cellular (3GPP) services are interrupted.

SUMMARY

It has been recognised here that upon failure of a 3GPP service for a wireless terminal, that a Wi-Fi fall back can be used to offer data service continuity and mobility. If a 3GPP interruption is detected, a public Wi-Fi service on the Wi-Fi AP providing an on demand radio coverage within range or a zone covering the WT is enabled and provided with WT MAC addresses for affected WTs. The affected WTs therefore become associated with that Wi-Fi AP. A list of the affected WT MAC addresses is then communicated to the neighbouring APs in the covered zone or to APs of adjacent zones as part of the service handover cycle through the Wi-Fi network to enable WTs to move from one serving Wi-Fi AP to another to maintain data services for the WT until such time as the data session is terminated by the user. Once the data session is terminated, the WT MAC address is removed from the authorized access list at each Wi-Fi AP.

According to a first aspect, there is presented a method, performed in a Wi-Fi network node of a Wireless Network providing cellular and Wi-Fi services. The method comprises, receiving a request to enable Wi-Fi access to wireless terminals (WTs) located in a zone covered by said Wi-Fi network node. Receiving a request for a new data session from a WT and adding the MAC address of said WT to a list of authorized users such that data sessions can be enabled for said WT located in said covered zone. The MAC address of said WT is then sent to other Wi-Fi network nodes in said covered zone and Wi-Fi network nodes of adjacent zones such that said WT can have continuous data services as it moves within said covered zone and other zones adjacent thereof. When an indication that the WT data session is terminated is received at a Wi-Fi network node currently serving said WT, a message is sent from said serving Wi-Fi network node, to other Wi-Fi network nodes in said covered zone and Wi-Fi network nodes of adjacent zones to remove the MAC address of said WT from said list of authorized users.

According to another aspect, there is presented a Wi-Fi network node providing cellular and Wi-Fi services. The Wi-Fi network node comprising: a processor; and a computer program product storing instructions that, when executed by the processor, causes the Wi-Fi network node to: enable access to all new data sessions for wireless terminals (WTs) located in a Wi-Fi zone covered by said Wi-Fi network node; add the MAC address of said WTs to a list of users authorized to access said Wi-Fi network node; send the MAC address of said WT to other Wi-Fi network nodes of said covered zone and zones adjacent thereof such that said WT can have continuous service as it moves between Wi-Fi nodes of one zone and from one zone to another zone; receive at a Wi-Fi network node currently serving said WT an indication that the WT data session is terminated; and send a message from said serving Wi-Fi network node, to other Wi-Fi network nodes in said covered zone and Wi-Fi network nodes of adjacent zones to remove the MAC address of said WT from said list of authorized users.

According to another aspect, there is presented a computer program comprising a computer program code which, when run on Wi-Fi network node, causes the Wi-Fi network node to: enable access to all new data sessions for wireless terminals located in a Wi-Fi zone covered by said Wi-Fi network node; add the MAC address of said WTs to a list of users authorized to access said Wi-Fi network node; send the MAC address of said WT to other Wi-Fi network nodes of said covered zone and zones adjacent thereof such that said WT can have continuous service as it moves between Wi-Fi nodes of one zone and from one zone to another; receive at a Wi-Fi network node currently serving said WT an indication that the WT data session is terminated; and send a message from said serving Wi-Fi network node, to other Wi-Fi network nodes in said covered zone and Wi-Fi network nodes of adjacent zones to remove the MAC address of said WT from said list of authorized users.

According to another aspect, there is presented a method, performed in a wireless terminal (WT) being capable of communicating both with a mobile communication network and a Wi-Fi access point (AP). The method comprising: detecting the presence of a Wi-Fi AP which said WT is not currently authorized to access; detecting the failure of a cellular RF radio currently serving said WT; detecting that said Wi-Fi AP is now available for access; sending a request for a new data session to said Wi-Fi AP; completing a hand shake with said Wi-Fi AP to activate said new data session; detecting the presence of another Wi-Fi AP which is now available for access as said WT moves within a zone or from one zone served by said Wi-Fi AP to a zone served by said other Wi-Fi AP.

According to another aspect, there is presented a wireless terminal being capable of communicating both with a mobile communication network and a Wi-Fi access point. The wireless terminal comprising: a processor; and a computer program product storing instructions that, when executed by the processor, causes the wireless terminal to: detect the presence of a Wi-Fi AP which said WT is not currently authorized to access; detect the failure of a cellular RF radio currently serving said WT; detect that said Wi-Fi AP is now available for access; send a request for a new data session to said Wi-Fi AP; complete a hand shake with said Wi-Fi AP to activate said new data session; detect the presence of another Wi-Fi AP which is now available for access as said WT moves within a zone or from one zone served by said Wi-Fi AP to a zone served by said other Wi-Fi AP.

According to another aspect, there is presented a computer program comprising computer program code which, when run on a wireless terminal being capable of communicating both with a mobile communication network and a Wi-Fi access point, causes the wireless terminal to: detect the presence of a Wi-Fi AP which said WT is not currently authorized to access; detect the failure of a cellular RF radio currently serving said WT; detect that said Wi-Fi AP is now available for access; send a request for a new data session to said Wi-Fi AP; complete a hand shake with said Wi-Fi AP to activate said new data session; detect the presence of another Wi-Fi AP which is now available for access as said WT moves within a zone or from one zone served by said Wi-Fi AP to a zone served by said other Wi-Fi AP.

According to another aspect, there is presented a method, performed in a Wi-Fi Access Controller (AC) being capable of communicating both with a mobile communication (3GPP) network radio and a Wi-Fi access point (AP), both said radio and AP serving an overlapping service zone. The method comprising: detecting a 3GPP service failure event, instructing said 3GPP network radio to disable cellular RF ports associated with said failure event for an affected zone, instructing a normally private Wi-Fi AP serving said affected zone to enable access to all new data sessions from Wireless Terminals (WT) in said affected zone, receiving from said serving Wi-Fi AP, a list of MAC addresses associated with one or more WT requesting a new data session with said serving Wi-Fi AP or any other Wi-Fi AP in a zone managed by said AC or in a zone adjacent thereof.

According to another aspect, there is presented A Wi-Fi Access Controller (AC) capable of communicating both with a mobile communication (3GPP) network radio and a Wi-Fi access point (AP), both said radio and AP serving an overlapping service zone. The Wi-Fi AC comprising: a processor, and a computer program product storing instructions that, when executed by the processor, causes the Wi-Fi AC to: detect a 3GPP service failure event, instruct said 3GPP network radio to disable cellular RF ports associated with said failure event for an affected zone, instruct a normally private Wi-Fi AP serving said affected zone to enable access to all new data sessions from Wireless Terminals (WT) in said affected zone, receive from said normally private Wi-Fi AP, a list of MAC addresses associated with one or more WT requesting a new data session with said Wi-Fi AP or any other Wi-Fi AP in a zone managed by said AC.

According to another aspect, there is presented A computer program comprising computer program code which, when run on a Wi-Fi Access Controller (AC) capable of communicating both with a mobile communication (3GPP) network radio and a Wi-Fi access point (AP), wherein both said radio and AP serve an overlapping service zone, causes the Wi-Fi AC to: detect a 3GPP service failure event, instruct said 3GPP network radio to disable cellular RF ports associated with said failure event for an affected zone, instruct a normally private Wi-Fi AP serving said affected zone to enable access to all new data sessions from Wireless Terminals (WT) in said affected zone, receive from said normally private Wi-Fi AP, a list of MAC addresses associated with one or more WT requesting a new data session with said Wi-Fi AP or any other Wi-Fi AP in a zone managed by said AC.

Wi-Fi is to be understood to be a wireless network that is based on any one or more of the IEEE 802.11 standards.

The invention has the advantages of providing a fall back mechanism to increase wireless service availability and mobility. The fall back service availability and mobility is managed using a WT address list which is communicated to other Wi-Fi AP either in the same zone or in adjacent zones and which does not require modifications to existing WT or impact 3GPP and 802.11 protocol standards.

BRIEF DESCRIPTION OF THE DRAWINGS

In order that the invention may be more fully understood, some of the embodiments of the invention will now be described, by way of example only, with reference to the accompanying drawings, in which.

DETAILED DESCRIPTION

A Wireless Terminal (WT) as described herein may comprise or represent any device used for wireless communications. Examples of equipment that may be used in certain embodiments of the described wireless and mobile networks are wireless devices such as mobile phones, mobile or fixed terminals, stations (e.g. in the IEEE 802.11 standard a UE may be a station (STA)), smart phones, portable computing devices such as lap tops, handheld devices, tablets, net books, computers, personal digital assistants, machine-to-machine devices such as sensors or meters (e.g. wireless devices in which there is no end user associated with the device), and other wireless communication devices that may connect to wireless and/or mobile networks.

The 3GPP and Wi-Fi networks (WN) described herein can either be indoor or outdoor integrated wireless networks where an integrated wireless network node shares both a 3GPP radio and a Wi-Fi access point (AP) for mobility services. An integrated node can be defined in the physical sense as one radio supporting both 3GPP and Wi-Fi or 2 radios each supporting one of the access technologies. An integrated wireless network is meant to include the availability of both 3GPP RF radio and a Wi-Fi AP RAN services at the same location.

Wi-Fi networks (WN) as described herein may comprise a Wi-Fi Access Network (AN) or a Wireless Local Area Network (WLAN)

Figure 1A:
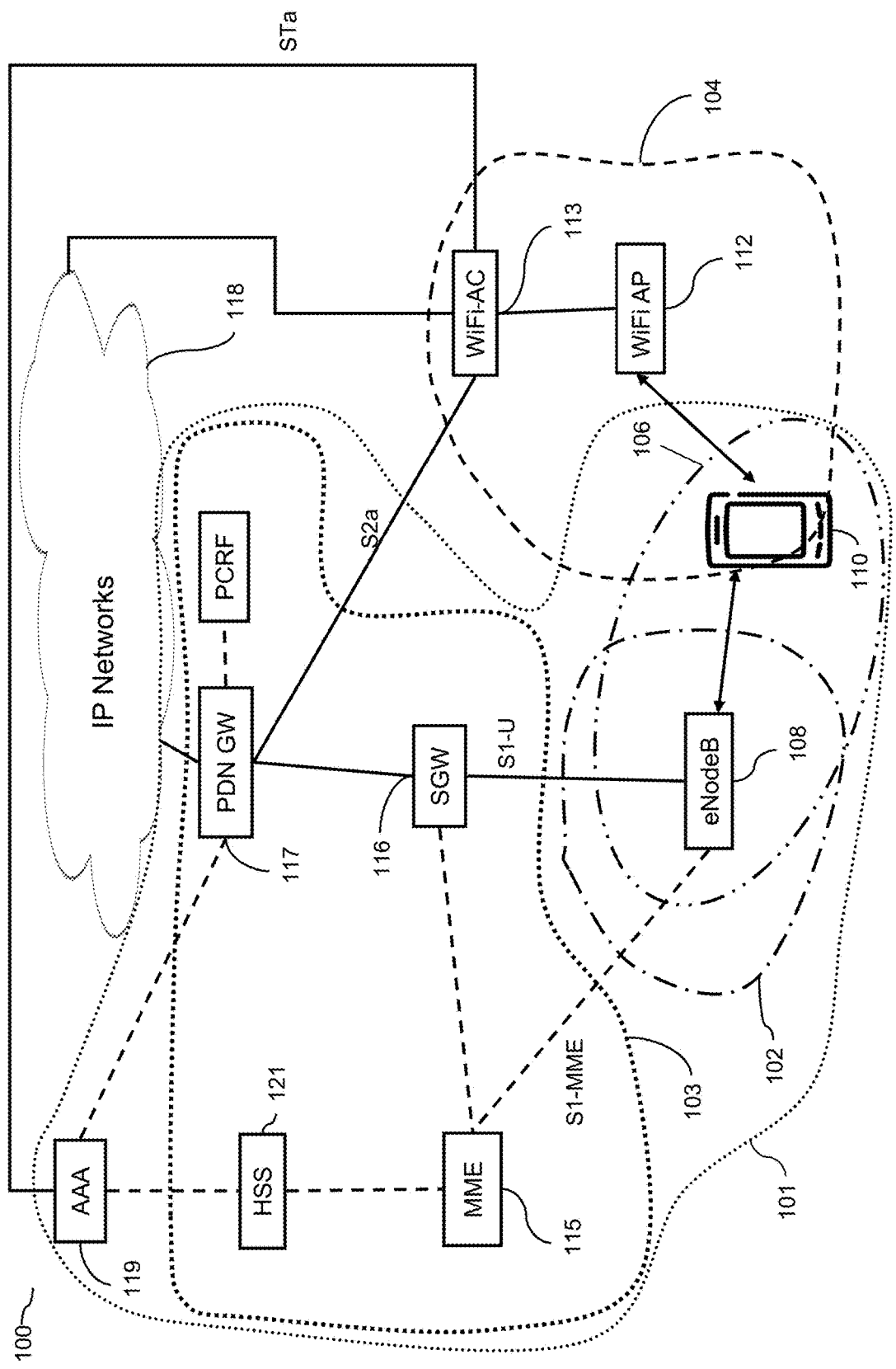
FIG. 1a is a schematic illustration of a communication system including a RAN with a Wi-Fi AP.

A Wi-Fi access point (AP) as described herein may comprise or represent any devices used by WTs to connect to a wired network using Wi-Fi, or related standards. FIG. 1a illustrates a simplified network architecture for a communications system 100 including a telecommunications network 101 (also known as a mobile or cellular network), where the telecommunication network 101 (represented by the round-dotted line area) includes a RAN 102 and core network 103 parts. The core network part 103 is represented by the square-dotted line area and the RAN 102 is represented by the dashed-dot line area. The communications system 100 also includes a WLAN 104 and further IP networks 118 (e.g. the Internet or any other network). The wireless network 104 is represented by the dashed line area. The telecommunications network 101, IP networks 118 and WLAN 104 are connected together via various communication paths and are in communication with each other. In this example, the telecommunication network 101 is illustrated as being integrated with WLAN 104.

In this example, the telecommunication network 101 is an LTE based network and the RAN 102 includes an eNodeB 108 that is connected via the S1-interfaces (e.g. S1-MME and S1-U) to a Mobility Management Entity (MME) 115 and a Serving Gateway (SGW) 116, respectively, of the core network part 103. The core network part 103 also includes, among other network nodes and elements, a Home Subscriber Server 121 (HSS) and Proxy-Call Session Control function (P-CSCF, not shown). The eNodeB 108 serves or supports network cell 106 indicated by the dashed-double-dot line area. The WLAN 104 in this example is a Wi-Fi access network (AN) that is connected to the PDN-GW 117 of core network part 103 via an S2a interface and to the 3GPP Authentication, Authorization and Accounting (AAA) Server 119 via the STa interface. The WLAN 104 includes a wireless access point (AP) 112, which is a Wi-Fi AP. The wireless AP 112 is connected to a wireless access controller (AC) 113, which in this example is a Wi-Fi AC. The wireless AC 113 may connect the WLAN 104 to further IP Networks (e.g. the Internet) directly or via PDN GW 117 via core network part 103.

The network cell 106 and the WLAN 104 include a WT 110, which includes radio access technology (RAT) for communicating with the eNodeB 108, which supports or serves the WT 110. As shown, the WT 110 is in communication with the eNodeB 108 of RAN 102 and may also include suitable RAT for communicating with WLAN 104 via wireless AP 112. As the telecommunication network 101 is integrated with the WLAN 104 (e.g. via the S2a link between PDN-GW 117 and wireless AC 113), the wireless AC 113 communicates with the 3GPP AAA Server 119 for use in authorizing the WT 110 in accessing both the WLAN 104 and in accessing the telecommunication network 101 via the WLAN 104. If the telecommunication network 101 was not integrated with the WLAN (e.g. no S2a link), then the wireless AC can still communicate with the 3GPP AAA Server 119 for use in authorizing the WT 110 in accessing the WLAN 104.

Although the above describes one deployment option, it is to be appreciated by the person skilled in the art that there are multiple deployment options for integrating a mobile network with a wireless network. Some examples may include: connecting the wireless AC 113 to a Broadband Network Gateway (BNG) (not shown) to connect the wireless network 104 to the further IP networks 118 and PDN GW 117; collocating the wireless AP 112 with a Residential Gateway (RG), deploying the wireless AP 112 and wireless AC 113 without a BNG as in the example above; or even deploying the wireless AP 112 with an RG and a BNG but without an wireless AC 113. In addition, it is to be appreciated that there are multiple options for terminating/connecting the S2a interface. Some further examples include, connecting the S2a interface between a wireless AP 112/RG and PDN GW 117; between wireless AC 113 and PDN GW 117 (as shown in the FIG. 1a example); between BNG and PDN GW 117; or between a dedicated Trusted wireless local area network (WLAN) Access Gateway (TWAG) and PDN GW 117.

Figure 1B:
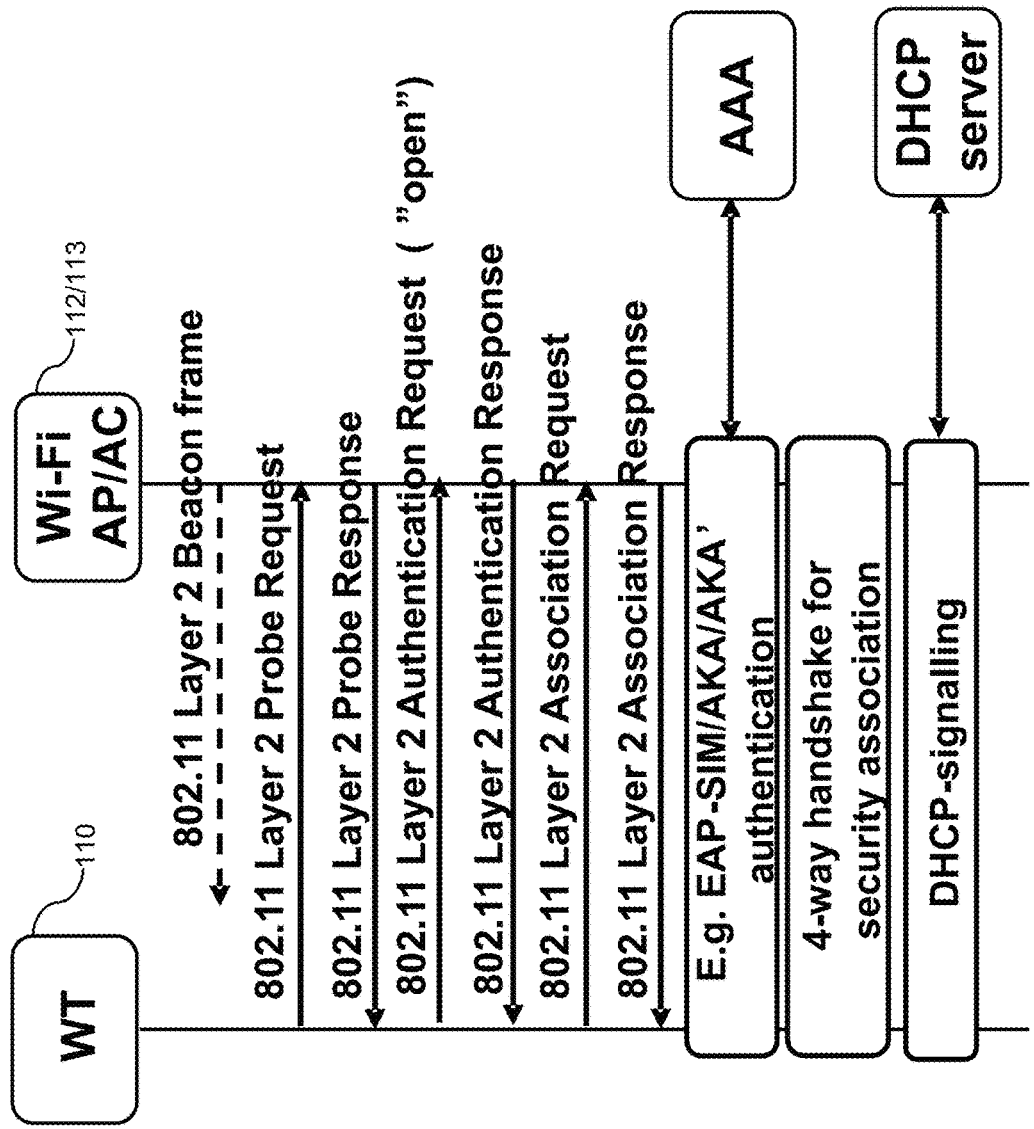
FIG. 1b is a schematic illustration of the Wi-Fi access messages a WT transmits during connection to a Wi-Fi based on IEEE 802.11 standard.

FIG. 1b illustrates the possible WLAN access messages when a WT 110 initiates or connects to the WLAN 104 based on the IEEE 802.11 standard. The WT 110 associates with wireless AP 112 to obtain WLAN 104 services in which association is the process by which a WT joins the WLAN 104. The WT 110 initiates the association process, and the wireless AP 112 may choose to grant or deny access based on the contents of an association request. If WT 110 moves between basic service areas within a single extended service area, it must evaluate signal strength and perhaps switch from wireless AP 112 to another wireless AP (not shown). Authentication is a necessary prerequisite to association because only authenticated users may be authorized to use the WLAN 104.

Figure 1C:
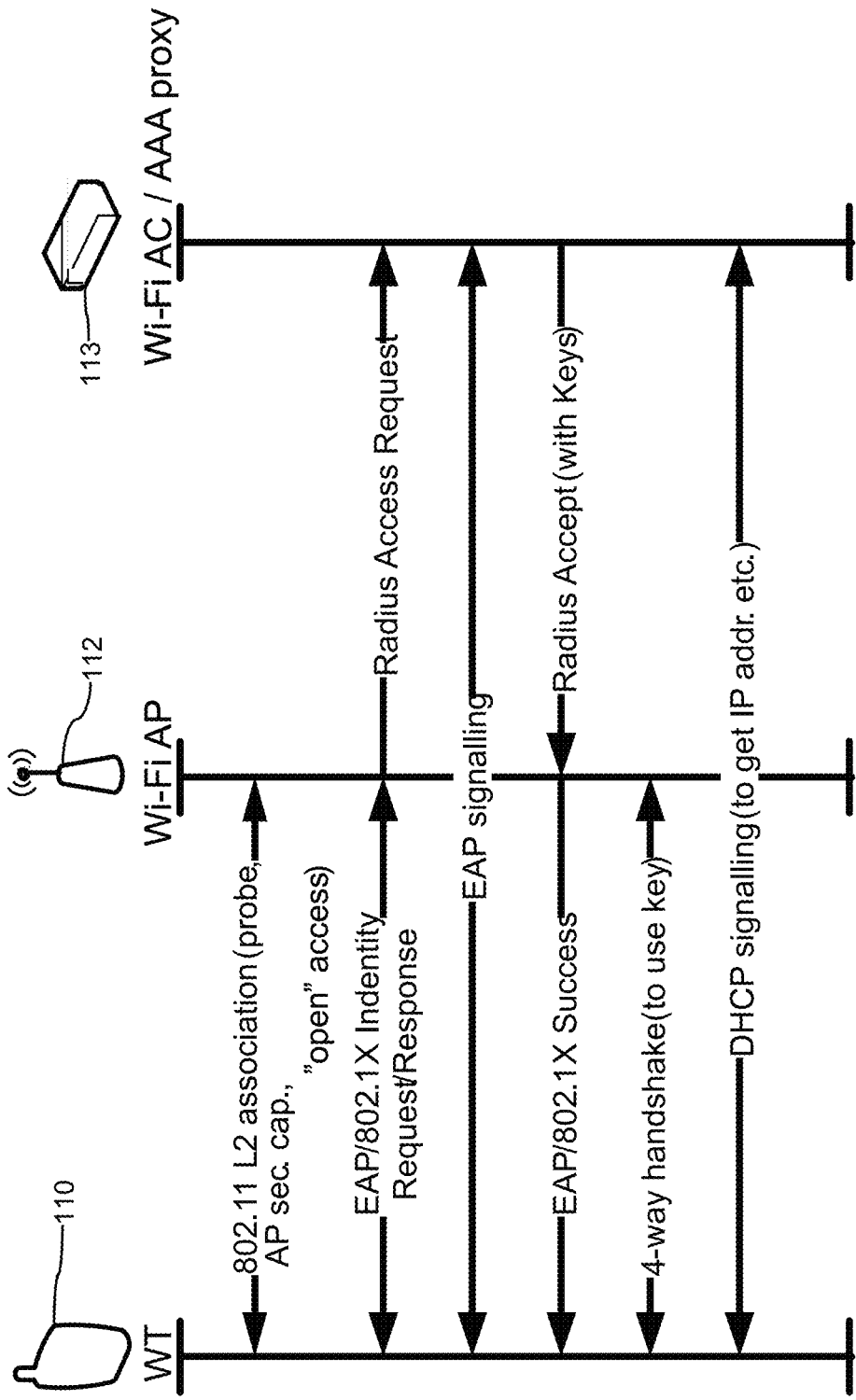
FIG. 1c is a schematic illustration of the Wi-Fi access messages a WT transmits during connection to a Wi-Fi based on IEEE 802.11 standard using EAP authentication.

FIG. 1c illustrates the possible WLAN access messages for WT 110 connecting to WLAN 104 via wireless AP 112 and AC 113 when Extensible Authentication Protocol (EAP) signalling is used to authenticate the WT 110 towards the WLAN 104. The WT 110 uses IMSI or some other certificate to identify itself towards the WLAN 104. Note that the IEEE 802.11 Authentication Response only opens limited ports to allow the EAP Authentication to proceed. The IEEE 802.11 Layer 2 Association Response only provides a "pending association" and full association is granted upon successful completion of EAP Authentication. When the WT 110 accesses the WLAN 104 it can be authenticated using, for example, EAP-Subscriber Identity Module (SIM)/EAP—Authentication and Key Agreement (AKA)/EAP—AKA Prime (AKA') protocols. The WT 110 can in these cases be identified by either the full authentication Network Access Identifier (NAI) or by the fast re-authentication NAI. The full authentication NAI contains the International Mobile Subscriber Identity (IMSI) of the WT 110 and the fast re-authentication NAI is similar to the temporary identities used in LTE access and are called as fast re-authentication identity or pseudonym.

Most current Wi-Fi deployments are totally separate from mobile networks, and are to be seen as non-integrated. From the terminal perspective, most mobile operating systems for wireless terminals such as Android and iOS, support a simple Wi-Fi offloading mechanism where the wireless terminals immediately switch all their PS (Packet Switched) bearers to a Wi-Fi network upon a detection of such a network with a certain signal level. The decision to offload to a Wi-Fi or not is referred henceforth as access selection strategy and the aforementioned strategy of selecting Wi-Fi whenever such a network is detected is known as "Wi-Fi-if-coverage".

There are several drawbacks of the Wi-Fi-if-coverage strategy:

Though the user/wireless terminal can save previous passcodes for already accessed Wi-Fi Access Points (APs), hotspot login for previously un-accessed APs usually requires user intervention, either by entering the passcode in Wi-Fi connection manager or using a web interface.

Interruptions of ongoing services can occur due to the change of IP address when the wireless terminal switches to the Wi-Fi network. For example, a user who started a VoIP call while connected to a mobile network is likely to experience call drop when arriving home and the wireless terminal automatically switches to the Wi-Fi network. Although some applications are smart enough to handle this and survive the IP address change (e.g. Spotify), the majority of current applications don't. It also places a lot of burden on application developers if they have to ensure service continuity.

As indicated previously, if access by a WT to a 3GPP network radio fails, Wi-Fi off-loading will not help provide continuity of service for a data session.

Figure 2:
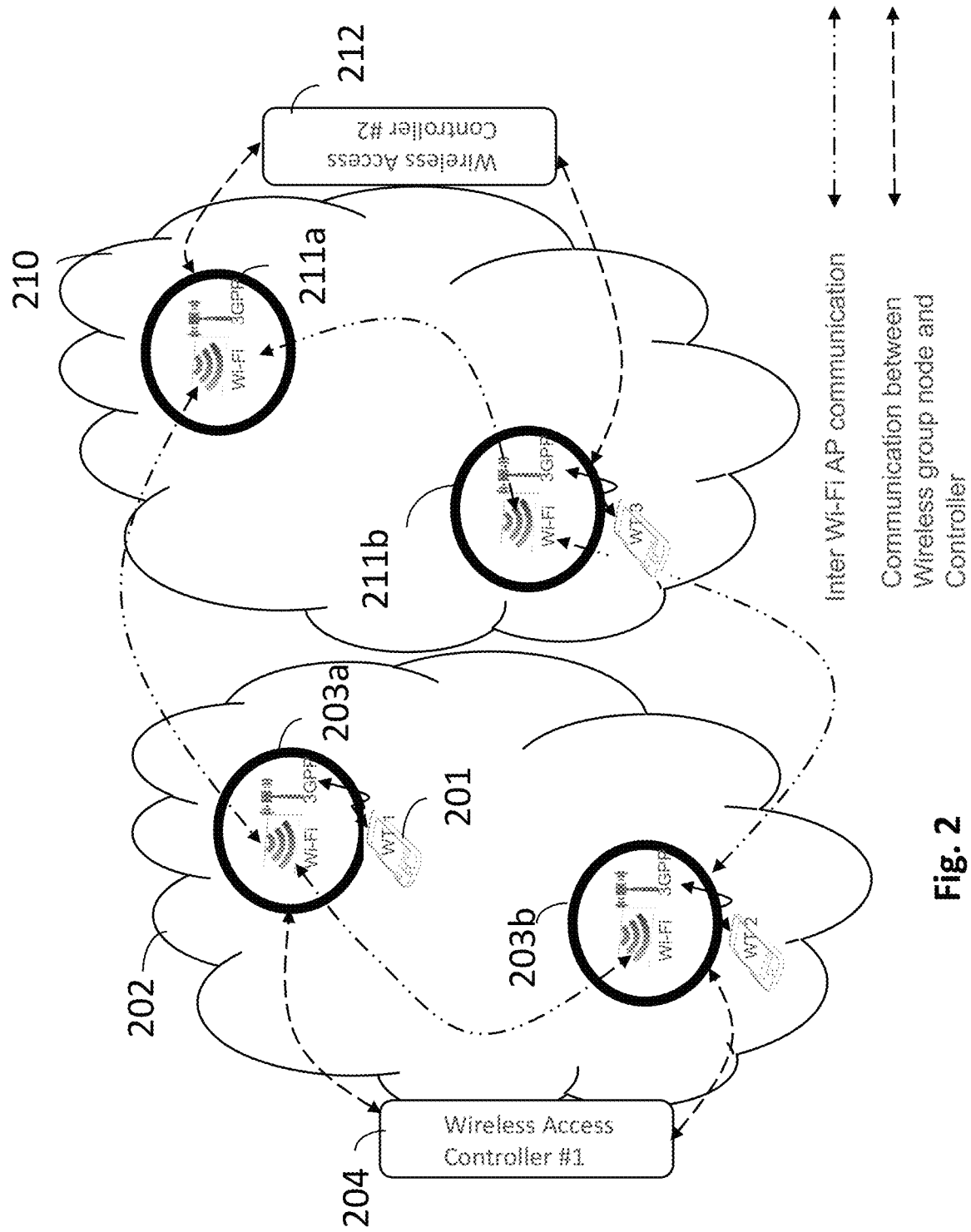
FIG. 2 is a schematic illustration of an integrated wireless system according to an embodiment of the present invention.

With reference to FIG. 2, we have shown a diagram illustrating an integrated wireless network according to an embodiment of the present invention. In the scenario illustrated in FIG. 2, a wireless terminal (WT) 201 is operating in a wireless zone 202 on a 3GPP cellular network via a first integrated Wi-Fi and cellular network radio node 203a. Other areas of the wireless zone 202 may be served by additional integrated wireless network nodes, such as node 203b. In the current embodiment, the wireless network gives priority of service via the 3GPP cellular system. Therefore, as the WT moves from one end of zone 202 to the other, it will need to be transferred to another node, such as 203b as per standard 3GPP hand-over protocols. A private, perhaps paid on demand Wi-Fi network which requires authentication but no mobility may exists via a Wi-Fi access point (AP) at each node, however, the user must manually connect and enter the correct Wi-Fi credentials in order to be authenticated on the Wi-Fi network for that zone. Therefore, during normal operation, when the user is communicating via the 3GPP cellular network, a Wi-Fi-if coverage strategy as described above will not be available and by default the WT will be connected to the network via 3GPP radios at each node. Zone 202 is provided with a Wireless access controller (AC) 204 which manages and monitors each of the integrated Wi-Fi and cellular network nodes 203a and 203b, in zone 202.

If WT 201 moves into an adjacent wireless zone 210, its 3GPP cellular session will be transferred to a suitable node according to standard 3GPP hand-over protocols. Zone 210 is similarly provided with one or more nodes 211a and 211b, providing integrated Wi-Fi and cellular network services and AC 212 to manage and monitor nodes 211a and 211b.

It should be noted that AC 204 and 212 are not designed to communicate with each other across zones. Their management and monitoring tasks are focused on their respective radios and APs in their respective wireless zones.

In operation, a WT 201 in zone 202 will by default establish a data session via the 3GPP cellular network radio of node 203a since as indicated above, WT 201 doesn't have open access to a Wi-Fi AP. Such access is normally only available if the user manually connects to the Wi-Fi service and enters the required Wi-Fi credentials for network authentication.

If the AC 204 detects a 3GPP radio failure at node 203a, AC 204 will open access to the Wi-Fi AP of node 203a to convert it to a free public Wi-Fi service and thus to permit WT 201 to connect to the Wi-Fi AP of node 203a and continue its data session. This can either be done automatically if the WT is able to complete fast switching as described above or by having to manually initiate a data session with the Wi-Fi AP. Therefore, even though the 3GPP radio of node 203a is unavailable, WT 201 is able to continue its data session via the Wi-Fi AP and the Wi-Fi AP takes over as a fall back for data services of WT 201. It should be noted that any WT in the vicinity of node 203a which requires access to data services will also have access to the Wi-Fi AP since they will not be able to initiate a data session via the 3GPP radio at node 203a.

Mobility of WT 201 or any newly connected WTs within zone 202, towards node 203b for example, is done over the Wi-Fi network even if the 3GPP radio of node 203b is operational. There are advantages to maintaining a data session on a single access network as explained previously. In the preferred embodiment, as the WT 201 moves away from node 203a, a session handover cycle is triggered. However, before the handover cycle is terminated, the Wi-Fi AP of node 203a broadcasts a WT MAC address list to neighboring Wi-Fi APs. The list contains the MAC addresses of all WTs now connected to Wi-Fi AP of node 203b. The list will then be uploaded at each neighboring Wi-Fi APs so as to provide fast access to another AP in the vicinity of the WT. The list of WT MAC addresses can be communicated to neighboring Wi-Fi APs using a variation of the 802.11F protocol for inter-access point communication. With this technique, mobility within the same zone or across multiple zones by a WT becomes feasible while still maintaining an open data session. For example, WT 201 of FIG. 2 could move either entirely within zone 202 or towards and into zone 210 and connect to node 211a or 211b using only the Wi-Fi network provided by these APs. The WT's data session will continue on the Wi-Fi network until such time as the session is terminated by the user.

Once terminated, the last serving Wi-Fi AP broadcasts a message to neighboring Wi-Fi APs to remove the MAC address of a WT terminal that has terminated its data session from their lists of authorized terminals. In FIG. 2, if WT 201 has terminated its data session, then its MAC address will be deleted from all neighboring Wi-Fi APs. If at a later time WT 201 initiates a new data session in zone 210, it will be through the 3GPP network since all RF radios in that zone are still operational. Therefore, only WTs affected by the failure of a 3GPP radio at a serving node will be allowed to access Wi-Fi APs to continue an existing data session or initiate a new session.

The WT MAC address can be added to a Wi-Fi AP MAC address list under anyone of the following conditions: a) when an AC detects failure of a 3GPP radio at one of its nodes; b) during a Wi-Fi session handover and c) at start-up of a Wi-Fi AP. For condition a), the AC will add the MAC address of the affected WTs to a fall back Wi-Fi AP MAC address list on the same node where failure of the 3GPP radio has occurred. With condition b), the source Wi-Fi AP will broadcast its MAC address list to neighboring Wi-Fi APs using the Inter-Access Point Protocol (IAPP). With condition c), the newly started AP will send an Hello Message to neighboring APs that will then broadcast their MAC address lists to enable synchronization with its neighbors.

As indicated above, the WT MAC address is removed from a Wi-Fi AP MAC address list when the in progress Wi-Fi session is terminated. This will trigger the following: a) The source or serving Wi-Fi AP will remove the WT MAC address from its list and broadcast to neighboring Wi-Fi APs the WT MAC address for removal from their list if it exists, and b) a neighboring Wi-Fi AP will also broadcast to its neighbors a WT MAC address removal message if the neighboring Wi-Fi AP had the WT MAC address in its MAC address list.

As can be derived from the above, the present solution offers an number of advantages for continued service and mobility, such as: i) increased data service availability through the use of integrated wireless network nodes (Wi-Fi & 3GPP); ii) the solution has no impact to either 3GPP or 802.11 protocol standards, iii) fallback path is seamlessly provided where 3GPP network failure occurs; iv) a fallback network will only be available to sessions initiated by WTs on nodes where 3GPP services is not available; and v) once a WT session is established through the fallback path, mobility will continue for that device through the fallback service until the data session is terminated.

Figure 3:
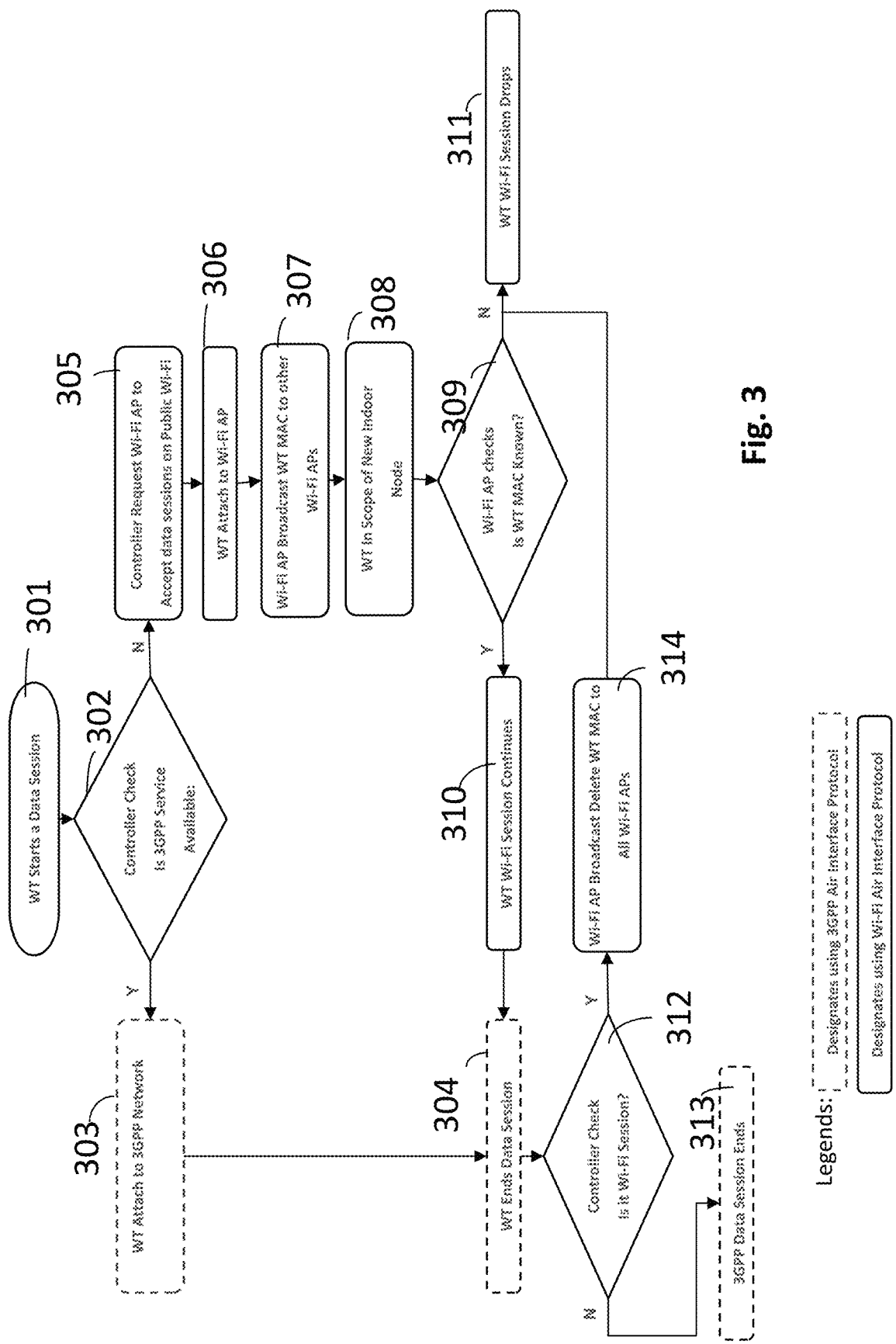
FIG. 3 is a flow diagram illustrating an example Wi-Fi fallback process according to the present invention.

With reference to FIG. 3, we have shown a flow diagram of the fallback process during a start-up data session of a WT according to an embodiment of the present invention. When a WT initiates a data session (block 301), the WT will then attempt to connect to an available wireless service. At block 302, the wireless access controller (AC) will check availability of 3GPP service since this is the default service. Wireless availability is managed and controlled by the AC which monitors the health of the wireless nodes, cellular and Wi-Fi within its zone. If the 3GPP network is available, the WT will connect to the 3GPP cellular network (block 303) using the existing 3GPP standards protocols. If the WT moves away from the serving node, a handover session is initiated. If a 3GPP service is available at a destination node, a standard 3GPP handover will be initiated. The WT will continue its data session until terminated by the user (block 304).

Back at block 302, if the AC finds that no 3GPP service is available at the network node closest to the WT requesting a data session, the AC will request a nearby AP to accept data sessions as a public Wi-Fi (block 305) for nearby WT requesting data sessions. If the WT support fast 3GPP to Wi-Fi data handover, the data service will connect with the AP (block 306). In order to enable the same level of mobility to a WT, that is, as if the WT was still connected to a 3GPP network, the Wi-Fi AP providing a data session for a newly connected WT will broadcast (block 307) the WT MAC address to other Wi-Fi APs. This way, as the WT moves within the integrated network, data services will continue with the movement of the WT. When the WT reaches a new node (block 308), the destination Wi-Fi AP verifies if the WT MAC address is known (block 309). If the WT MAC address is known, the WT Wi-Fi data session continues (block 310), otherwise the session is terminated (block 311).

Back at block 304, when the serving AC receives an indication that a data session has been terminated, it determines (block 312) if the data session was performed via the Wi-Fi or 3GPP network. If it was a terminated 3GPP session, the 3GPP data session is terminated (block 313) with no further action on the part of the AC. If the data session was a Wi-Fi session, the AC instructs the serving Wi-Fi AC to broadcast a message which includes the deletion of the WT MAC address to all Wi-Fi APs (block 314) and the session is terminated (block 311).

Figure 4:
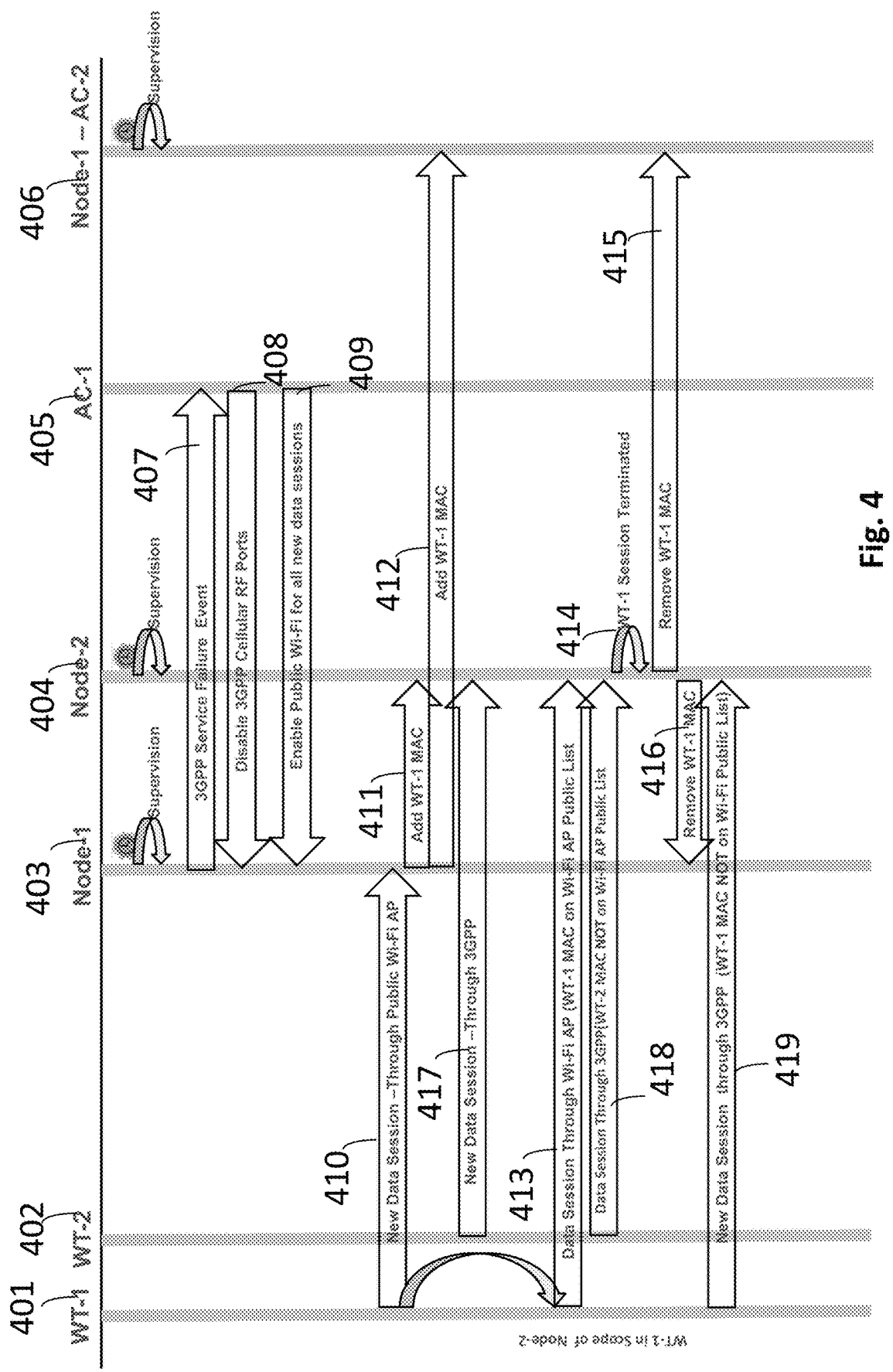
FIG. 4 is a signal flow diagram of an example process according to the invention when a WT requires fall back on the Wi-Fi network.

Referring now to FIG. 4, we have shown a sequence diagram illustrating the fallback process from the perspective of two WTs, WT-1 401 and WT-2 402. In this scenario we have two integrated network nodes, Node-1 403 and Node-2 404 served by AC-1 405 and AC-2 406. At the start, both nodes are monitoring or supervising network conditions with their respective ACs. Node-1 403 detects a 3GPP service failure and sends a failure event 407 to its associated controller AC-1 405. AC-1 405 then sends instructions 408 back to Node-1 403 to disable its 3GPP cellular ports. AC-1 405 further sends instructions 409 to Node-1 403 to enable Public Wi-Fi access for all new data sessions. WT-1 401 which is in scope of Node-1 403 requests a new data session which is provided 410 via the Public Wi-Fi AP at Node-1 403. The MAC address of WT-1 401 is then distributed 411 to Node-2 404. As indicated above, this allows service mobility as the WT moves from one node to another. Next, Node-1 403 sends the WT-1 MAC address 412 to neighboring APs and their respective ACs. As WT-1 403 becomes in scope with Node-2 404, its data session is transferred 413 over to Node-2 404 since Node-2 404 now has WT-1's MAC address. Once WT-1 403 terminates its data session 414, the serving node, in this case Node-2 404 sends instructions to neighbouring nodes and its wireless access controller AC-2 406 to remove the MAC address from its list 415 and 416.

In parallel to the events performed by WT-1 401, a second terminal WT-2 402 which is in scope with Node-2 404 requests a new data session 417. Since Node 2 continues to have 3GPP service, the data session of WT-2 402 is on the 3GPP network 418 and the MAC address of WT-2 402 is not required by the AP of Node-2 404. Similarly, if WT-401 initiates a new data session near Node-2 404, its request 419 will also be via the 3GPP network as opposed to the Wi-Fi AP of Node-2 404 since the 3GPP radio at that node is available.

The clock and the circular arrow is intended to represent a periodic hardware health check/supervision which will always be running.

Figure 5:
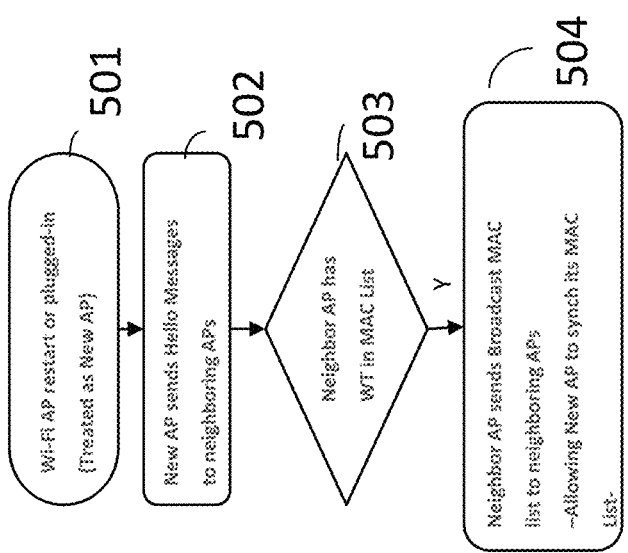
FIG. 5 is a flow diagram illustrating a WT MAC list management during a Wi-Fi AP start-up sequence.

Referring now to FIG. 5, we have shown a flow chart describing the WT MAC address list management details during the restart of an AP or newly installed AP. Once a Wi-Fi AP restarts or is first powered up, the AP will be treated as New AP—(block 501). The new AP sends a Hello Message to each neighboring AP (block 502). If a neighbor AP has a MAC address list of WTs (block 503), the neighbour Wi-Fi AP then broadcasts the list of MAC addresses to its neighbors (block 504) allowing the new restarted AP to sync up its WT MAC address.

Figure 6:
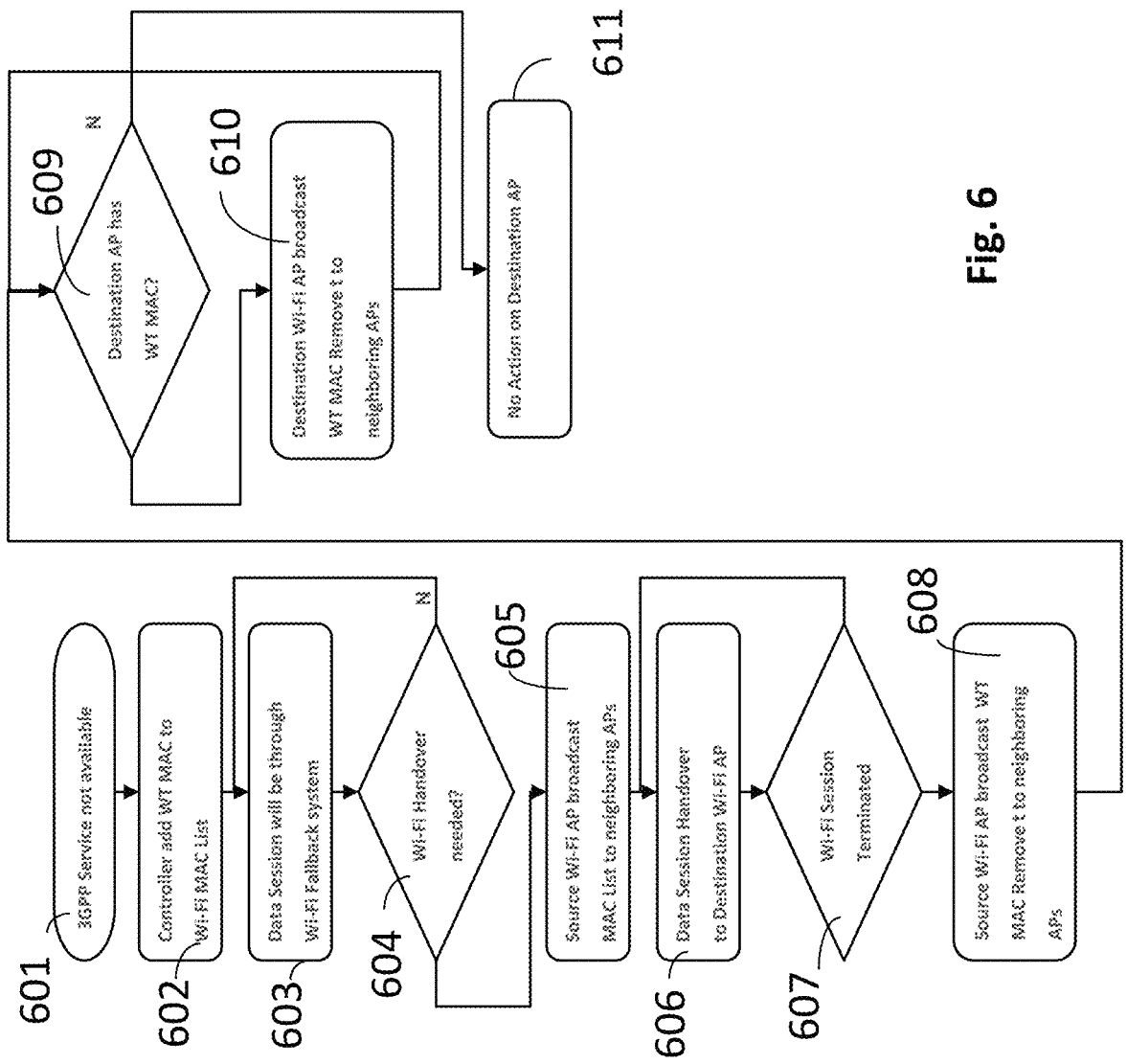
FIG. 6 is a flow diagram illustrating a WT MAC list management during a data session handling sequence.

FIG. 6 is a flow chart describing the management of Wi-Fi AP WT MAC address list when a WT attempts to establish a data session at a node where the 3GPP radio is not available or has failed. The data session initiation sequence is started when an impacted AC detects that 3GPP services at a serving node is not available (block 601). The AC will add the MAC address (block 602) of the WT which initiated the data session to a Wi-Fi AP of the affected node, that is, the node which has a failed 3GPP radio. The initiated data session of the WT will be through the Wi-Fi fallback system for the duration of the session (block 603). At block 604, a query is made to determine if a Wi-Fi Handover is needed. If the WT remains stationary, the data session continues as started at block 603. If the WT moves away from the serving node, the data session over Wi-Fi will need to be handed over to a destination node. Before this can happen, the source Wi-Fi AP will broadcast the WT MAC address or a list of MAC addresses if there are multiple WTs to neighboring APs (ie. Potential destination APs) (block 605). As the WT moves towards the a neighboring AP, the data session is handed over to the destination Wi-Fi AP. The data session continues through the Wi-Fi fallback network (block 606) until such time as the user of the WT ends the session (block 607). If the session is terminated, the source Wi-Fi AP, that is, the AP currently serving the WT will broadcast (block 609) a message (block 608) to have the WT MAC address removed from neighboring APs since it will no longer be needed for mobility services. If a destination AP (block 610) has the WT MAC address it will also broadcast the same message to other neighboring APs until such time as all APs who could potentially have been handed over a data session have their MAC address lists purged of the WT MAC address. Otherwise no action is required on the part of the destination AP (block 611).

Although the invention has been described in terms of examples or preferred embodiments as set forth above, it should be understood that these examples or embodiments are illustrative only and that the claims are not limited to those examples or embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

It is to be noted that whenever used in the claims and description herein, the phrase to "connect to an access point" is equivalent to "associate with an access point".

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

The invention claimed is:

1. A method, implemented in a Wi-Fi access point (AP), of providing Wi-Fi access to a wireless terminal (WT) experiencing a cellular service failure, the method comprising:

switching from a secured Wi-Fi access mode to an open Wi-Fi access mode, responsive to the cellular service failure, to provide open Wi-Fi access to the WT experiencing the cellular service failure;

sending a MAC address of the WT to other Wi-Fi APs to instruct each of the other Wi-Fi APs to allow the WT to access Wi-Fi.

2. The method of claim 1, further comprising providing, via the open Wi-Fi access, continuity of a data session of the WT previously maintained via the cellular service.

3. The method of claim 1, further comprising transferring continuity of a data session of the WT to one of the other Wi-Fi APs.

4. The method of claim 1, further comprising receiving an instruction to switch to the open Wi-Fi access mode, responsive to the cellular service failure, from a Wi-Fi Access Controller.

5. The method of claim 1, further comprising revoking the open Wi-Fi access obtained by the WT during the open Wi-Fi access mode responsive to termination of a data session of the WT.

6. The method of claim 1, further comprising revoking the open Wi-Fi access obtained by the WT during the open Wi-Fi access mode responsive to receiving a request to remove the MAC address of the WT from a list of MAC addresses of WTs permitted to access Wi-Fi served by the Wi-Fi AP.

7. A Wi-Fi access point (AP) configured to provide Wi-Fi access to a wireless terminal (WT) experiencing a cellular service failure, the Wi-Fi AP comprising:

communication hardware configured to use Wi-Fi to connect the WT to a wired network;

processing hardware communicatively coupled to the communication hardware and configured to:

switch from a secured Wi-Fi access mode to an open Wi-Fi access mode, responsive to the cellular service failure, to provide open Wi-Fi access to the WT experiencing the cellular service failure;

send a MAC address of the WT to other Wi-Fi APs, via the communication hardware, to instruct each of the other Wi-Fi APs to allow the WT to access Wi-Fi.

8. The Wi-Fi AP of claim 7, wherein the processing hardware is further configured to provide, via the open Wi-Fi access, continuity of a data session of the WT previously maintained via the cellular service.

9. The Wi-Fi AP of claim 7, wherein the processing hardware is further configured to transfer continuity of a data session of the WT to one of the other Wi-Fi APs.

10. The Wi-Fi AP of claim 7, wherein the processing hardware is further configured to receive an instruction to switch to the open Wi-Fi access mode, from a Wi-Fi Access Controller via the communication hardware, responsive to the cellular service failure.

11. The Wi-Fi AP of claim 7, wherein the processing hardware is further configured to revoke the open Wi-Fi access provided to the WT responsive to termination of a data session of the WT.

12. The Wi-Fi AP of claim 7, wherein the processing hardware is further configured to revoke the open Wi-Fi access provided to the WT responsive to receiving a request, via the communication hardware, to remove the MAC address of the WT from a list of MAC addresses of WTs permitted to access Wi-Fi served by the Wi-Fi AP.

13. A non-transitory computer readable medium storing instructions for controlling a programmable Wi-Fi access point (AP), wherein said instructions, when executed by processing hardware of the programmable Wi-Fi AP, cause the Wi-Fi AP to:
  switch from a secured Wi-Fi access mode to an open Wi-Fi access mode, responsive to a cellular service failure, to provide open Wi-Fi access to a wireless terminal (WT) experiencing the cellular service failure;
  send a MAC address of the WT to other Wi-Fi APs to instruct each of the other Wi-Fi APs to allow the WT to access Wi-Fi.

\* \* \* \* \*